US012585069B2

(12) United States Patent　　(10) Patent No.: US 12,585,069 B2
Ukita et al.　　(45) Date of Patent: Mar. 24, 2026

(54) OPTICAL CONNECTOR

(71) Applicants: NIPPON TSUSHIN DENZAI CO., LTD., Komaki (JP); SUMITOMO ELECTRIC INDUSTRIES, LTD., Osaka (JP)

(72) Inventors: Yoshio Ukita, Komaki (JP); Tsuyoshi Imaizumi, Osaka (JP)

(73) Assignees: NIPPON TSUSHIN DENZAI CO., LTD., Komaki (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 498 days.

(21) Appl. No.: 18/019,292

(22) PCT Filed: Aug. 30, 2021

(86) PCT No.: PCT/JP2021/031750
　　§ 371 (c)(1),
　　(2) Date: Feb. 2, 2023

(87) PCT Pub. No.: WO2022/050222
　　PCT Pub. Date: Mar. 10, 2022

(65) Prior Publication Data
　　US 2023/0333324 A1　　Oct. 19, 2023

(30) Foreign Application Priority Data

Sep. 4, 2020　　(JP) ................................. 2020-148908

(51) Int. Cl.
　　*G02B 6/38*　　　　(2006.01)

(52) U.S. Cl.
　　CPC .......... *G02B 6/3821* (2013.01); *G02B 6/3806* (2013.01); *G02B 6/3825* (2013.01); *G02B 6/3869* (2013.01)

(58) Field of Classification Search
　　CPC ..................................................... G02B 6/3823
　　USPC ........................................................... 385/78
　　See application file for complete search history.

(56) References Cited

U.S. PATENT DOCUMENTS

| | | | |
|---|---|---|---|
| 2007/0211997 | A1 | 9/2007 | Saito et al. |
| 2011/0116745 | A1 | 5/2011 | Nishioka et al. |
| 2017/0082807 | A1 | 3/2017 | Yazaki et al. |
| 2017/0322379 | A1 | 11/2017 | de Jong et al. |

(Continued)

FOREIGN PATENT DOCUMENTS

| | | | |
|---|---|---|---|
| CN | 102854573 A | * | 1/2013 |
| CN | 102928932 A | * | 2/2013 |
| JP | 2006-184491 A | | 7/2006 |

(Continued)

*Primary Examiner* — Kaveh C Kianni
(74) *Attorney, Agent, or Firm* — Oliff PLC

(57) ABSTRACT

In an optical connector, a connector main body includes an integrally formed plug frame. The plug frame has a connecting portion accommodation portion accommodating a ferrule, a mechanical splice, and a spring biasing the mechanical splice toward the ferrule, and a guide portion guiding the optical fiber extending from an optical cable. The connecting portion accommodation portion and the guide portion are partitioned via a partition wall having a cylindrical protrusion protruding into the connecting portion accommodation portion. The guide portion has a curved face extending in a conical shape from the partition wall.

7 Claims, 15 Drawing Sheets

(56)  References Cited

U.S. PATENT DOCUMENTS

2019/0384011 A1    12/2019  Seita et al.

FOREIGN PATENT DOCUMENTS

| | | | | |
|---|---|---|---|---|
| JP | 2007-240855 A | | 9/2007 | |
| JP | 2010156831 A | * | 7/2010 | |
| JP | 2013-015727 A | | 1/2013 | |
| JP | 2015-22266 A | | 2/2015 | |
| JP | 2015-169729 A | | 9/2015 | |
| JP | 2020-12913 A | | 1/2020 | |
| WO | 2006/019161 A1 | | 2/2006 | |
| WO | WO-2011087077 A1 | * | 7/2011 | .......... G02B 6/3888 |
| WO | 2013/129485 A1 | | 9/2013 | |
| WO | 2018/135235 A1 | | 7/2018 | |
| WO | 2019/087584 A1 | | 5/2019 | |

* cited by examiner

OPTICAL CONNECTOR

TECHNICAL FIELD

The present disclosure relates to optical connectors.

This application claims priority based on Japanese Patent Application No. 2020-148908 dated Sep. 4, 2020, the entire contents of which are incorporated herein by reference.

BACKGROUND ART

Patent Literature 1 discloses a male optical connector. The male optical connector includes an outer housing and an outer sheath fixing portion connected to the outer housing. In the male optical connector, an optical cable is inserted into the outer sheath fixing portion, and the outer sheath of the optical cable is fixed to the outer sheath fixing portion. The outer housing is provided with a mechanical splice accommodation portion accommodating the mechanical splice.

Patent Literature 2 discloses a field-assembly-type optical connector. The optical connector includes a connector main body accommodating a ferrule provided with a clamp portion, and a retaining portion retaining an end of an optical fiber cable. The retaining portion has a fiber insertion hole into which an optical fiber is inserted, and a bending allowance space in which the optical fiber can be bent and deformed.

Patent Literature 3 discloses a field-assembly-type optical connector that connects an optical fiber by a mechanical splice method. The optical connector includes an optical connector main body, a gripping member, and an optical cable. The optical connector main body has a mechanical splice portion. Inside the mechanical splice portion, an inclined face is formed on which the optical fiber extending from the optical cable can be bent and deformed.

Patent Literature 4 discloses an optical connector that can be connected to an optical fiber protruded from an optical cable as a field-assembly-type optical connector. The optical connector has a housing accommodating an optical fiber. A guide portion guiding the optical fiber is provided on the inner surface of the housing. The guide portion is formed in a conical shape.

Patent Literature 5 discloses an optical fiber that includes a connector main body and an optical fiber connecting portion incorporated in the connector main body. The optical fiber connecting portion includes a mechanical splice including a base having a V-groove and a ferrule attached to the mechanical splice. The connector main body includes a main housing, an auxiliary housing connected to the main housing via hinges, and a cover housing connected to the auxiliary housing via hinges. The auxiliary housing is folded with respect to the main housing. The connector main body can be assembled by folding the cover housing with respect to the auxiliary housing.

CITATION LIST

Patent Literature

Patent Literature 1: International Publication WO 2006/019161
Patent Literature 2: International Publication WO 2013/129485
Patent Literature 3: International Publication WO 2019/087584

Patent Literature 4: Japanese Unexamined Patent Publication No. 2020-12913
Patent Literature 5: Japanese Unexamined Patent Publication No. 2015-22266

SUMMARY OF INVENTION

An optical connector according to one aspect of the present disclosure is an optical connector including a connector main body and an optical fiber connecting portion incorporated in the connector main body and having a built-in fiber connected to an optical fiber of an optical cable. The connector main body includes an integrally formed plug frame. The optical fiber connecting portion includes a ferrule holding the built-in fiber and a mechanical splice connecting the built-in fiber and the optical fiber to each other. The plug frame has a connecting portion accommodation portion accommodating the ferrule, the mechanical splice, and a spring biasing the mechanical splice, and a guide portion guiding the optical fiber extending from the optical cable. The connecting portion accommodation portion and the guide portion are partitioned via a partition wall having a cylindrical protrusion protruding into the connecting portion accommodation portion. The guide portion has a horseshoe-shaped opening portion and a curved face spreading in a conical shape from the partition wall.

DESCRIPTION OF EMBODIMENTS

Figure 1:
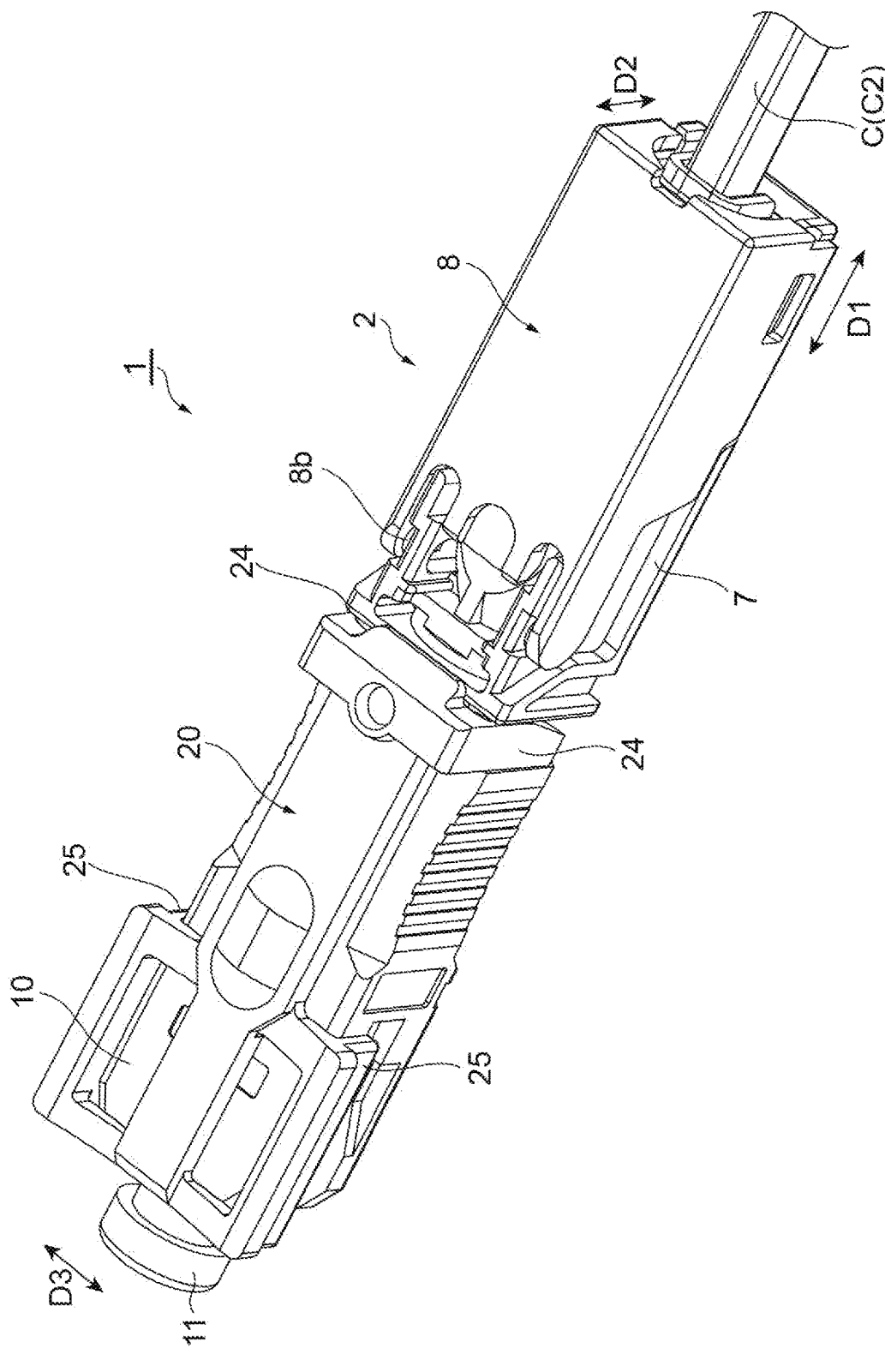
FIG. 1 is a perspective view illustrating an optical connector according to an embodiment.

By the way, in an optical connector that is assembled on site, there is a possibility that a certain amount of movement (protrusion or retraction) of the optical fiber occurs due to a change in temperature of the optical cable or the like. In order to absorb the amount of movement, a bending allowance space in which the optical fiber can be bent and deformed is provided inside. In some cases, at the site, the work of cutting the optical fiber of the optical cable may be performed. At this time, since the length of the cut optical fiber may vary, a configuration that allows the bending of the optical fiber during the connection work is adopted. However, there is a fact that the space for bending the optical fiber is limited, and it is required to secure a wider space for bending the optical fiber.

The present disclosure is to provide an optical connector capable of securing a wide space for bending of optical fibers.

Description of Embodiments of the Present Disclosure

First, contents of embodiments of the present disclosure will be listed and described. An optical connector according to one embodiment is an optical connector including: a connector main body and an optical fiber connecting portion incorporated in the connector main body and having a built-in fiber that is connected to an optical fiber of an optical cable. The connector main body includes an integrally formed plug frame. The optical fiber connecting portion includes a ferrule holding the built-in fiber and a mechanical splice connecting the built-in fiber and the optical fiber to each other. The plug frame has a connecting portion accommodation portion accommodating the ferrule, the mechanical splice, and a spring biasing the mechanical splice and a guide portion guiding the optical fiber extending from the optical cable. The connecting portion accommodation portion and the guide portion are partitioned via a partition wall having a cylindrical protrusion protruding into the connecting portion accommodation portion. The guide portion has a horseshoe-shaped opening portion and a curved face spreading in a conical shape from the partition wall.

In this optical connector, the connector main body includes an integrally formed plug frame, and the plug frame has a guide portion for guiding the optical fiber extending from the optical cable. Since the plug frame provided with the guide portion for guiding the optical fiber is integrally formed, the plug frame is configured with one component and is seamlessly manufactured. Therefore, the optical fiber can be avoided from being caught in the seams. Since the plug frame is integrally molded and configured with one component, the number of joints between the components can be reduced. Therefore, a wider internal space for the optical fiber can be secured than in the case of having a plurality of the components with the same external size. Therefore, a large space for bending the optical fiber can be secured. The connecting portion accommodation portion in which the connecting portion connecting the optical fiber of the optical cable to the built-in fiber is accommodated and the guide portion are separated by the partition wall, and the partition wall has a cylindrical protrusion protruding toward the connecting portion accommodation portion. Therefore, since the region for bending the optical fiber can be extended to the inside of the cylindrical protrusion, a wider region for bending the optical fiber can be secured. The guide portion in which the optical fiber is accommodated has a horseshoe-shaped opening portion and a curved face spreading in a conical shape from the partition wall. Therefore, the insertion of the optical fiber from the opening portion into the inside of the guide portion can be easily performed, and by the curved face spreading in a conical shape, a wider region for bending the optical fiber can be secured.

The mechanical splice may be arranged to be separated from the partition wall. In this case, a space for movement of the mechanical splice can be formed between the mechanical splice and the partition wall.

A portion of the spring may be arranged to surround the cylindrical protrusion. In this case, the cylindrical protrusion that widens the bending space of the optical fiber can be effectively used for arranging the spring.

The plug frame may have a bottom portion and a pair of wall portions defining an outer sheath fixing portion accommodation space accommodating the outer sheath fixing portion fixing the outer sheath of the optical cable. An end surface of each of the pair of wall portions facing the opposite side of the bottom portion may include a flat face having a width of 0.4 mm or more and a length of 2 mm or more. In this case, since a large area of the end surface of the plug frame facing the opposite side of the bottom portion of the plug frame can be secured, when the plug frame is molded with a resin, the possibility of deformation due to increased pressure from the mold can be reduced. Therefore, the molding of the plug frame can be easily performed.

The optical connector described above may include an outer sheath fixing portion fixing the outer sheath of the optical cable. The mechanical splice may have a V-groove into which the optical fiber is inserted, and the distance from the V-groove to the outer sheath fixing portion may be 19 mm or more. In this case, since the length from the V-groove from which the optical fiber extends to the outer sheath fixing portion can be set to 19 mm or more, the length of the space allowing the bending of the optical fiber can be increased.

The optical connector described above may include an outer sheath fixing portion fixing the outer sheath of the optical cable, and the curved face may be curved in an arc shape between the partition wall and the outer sheath fixing portion. The radius of curvature of the curved face may be 13 mm or more. In this case, since the curved face of the guide portion is curved in an arc shape, a wider space for the bending of the optical fiber in the guide portion can be secured. Furthermore, since the radius of curvature of the curved face is 13 mm or more, the loss of light due to bending of the optical fiber can be reduced more reliably.

Details of the Embodiments of the Present Disclosure

A specific example of an optical connector according to an embodiment will be described below with reference to the drawings. It is noted that the present invention is not limited to the examples described later, but is intended to include all modifications indicated in the scope of the claims and within the scope of equivalents to the scope of the claims. In the description of the drawings, the same or corresponding elements are denoted by the same reference numerals, and redundant descriptions are omitted as appropriate. In some cases, the drawings may be partially simplified or exaggerated for the ease of understanding, and dimensional ratio and the like are not limited to those illustrated in the drawings.

Figure 2:
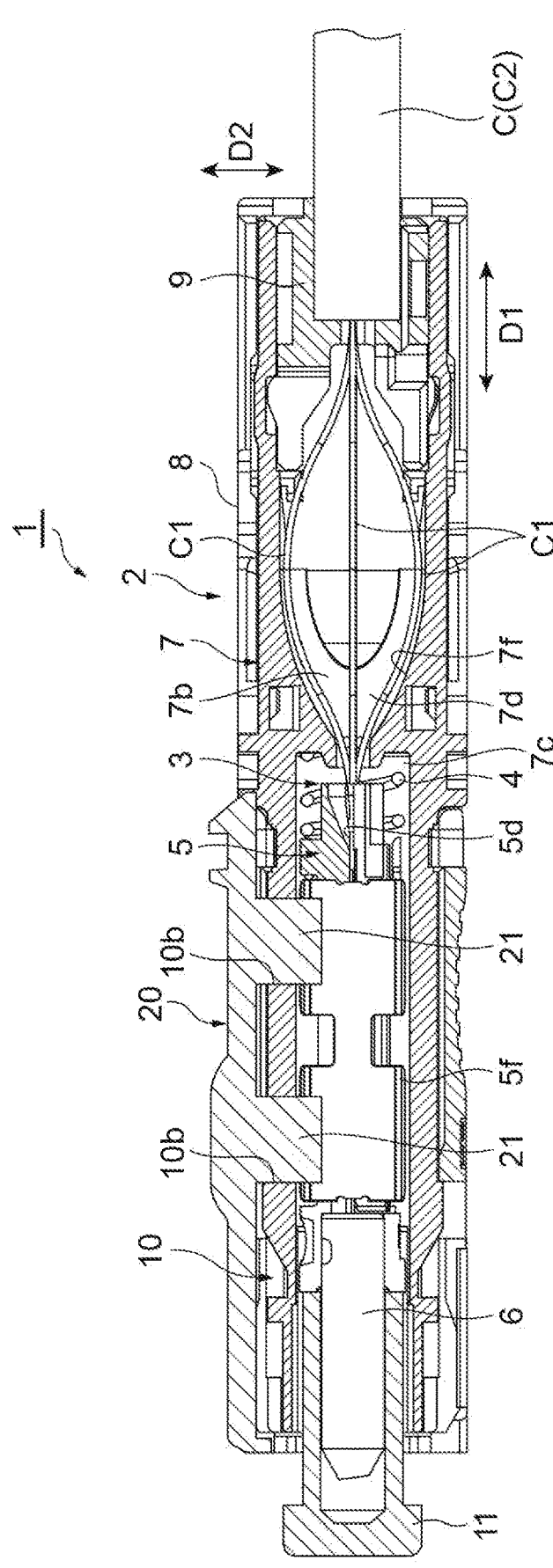
FIG. 2 is a longitudinal cross-sectional view illustrating the optical connector according to the embodiment.

FIG. 1 is a perspective view illustrating an example of optical connector 1 according to an embodiment. FIG. 2 is a longitudinal cross-sectional view of the optical connector 1 of FIG. 1. As illustrated in FIGS. 1 and 2, the optical connector 1 according to the present embodiment includes, for example, a connector main body 2, an optical fiber connecting portion 3 incorporated in the connector main body 2, a spring 4 arranged inside the connector main body 2, and a knob 10 covering the connector main body 2.

The optical fiber connecting portion 3 has, for example, a mechanical splice 5 and a ferrule 6 attached to the mechanical splice 5. Hereinafter, the direction in which the ferrule 6 is provided as viewed from the mechanical splice 5 may be described as "front", "front side" and "forward", and the opposite direction as "rear", "rear side" and "rearward". However, these directions are for the convenience of description and do not limit the positions or arrangement aspects of components.

The optical connector 1 has, for example, a long shape extending along an optical cable C. The connector main body 2 includes, for example, a plug frame 7 extending along a longitudinal direction D1 of the optical connector 1 and a rear cover 8 covering the plug frame 7. Hereinafter, the direction in which the rear cover 8 is provided with respect to the plug frame 7 may be referred to as "above", and the opposite direction as "below". The direction in which the plug frame 7 and the rear cover 8 are aligned side by side is described as a height direction D2, and the direction perpendicular to both the longitudinal direction D1 and the height direction D2 is described as a width direction D3. However, these directions do not limit the positions or arrangement aspects of the components.

As an example, the optical connector 1 is an on-site-provided type optical connector. For example, the optical connector 1 is connected to the optical cable C having an optical fiber C1 at the site of connection work. The optical cable C includes, for example, the optical fiber C1 having an optical fiber core wire and an outer sheath C2 covering the optical fiber C1. The connector main body 2 includes, for example, an outer sheath fixing portion 9 that is accommodated between the plug frame 7 and the rear cover 8. The outer sheath C2 of the optical cable C is fixed to the outer sheath fixing portion 9. The rear cover 8 is rotatable with respect to the plug frame 7 via, for example, a shaft portion 8*b* extending in the width direction D3. The shaft portion 8*b* is located at the front end of the rear cover 8.

The optical fiber C1 of the optical cable C extends from the outer sheath fixing portion 9 through an internal space 7*b* of the plug frame 7 to the inside of the mechanical splice 5. The optical fiber C1 is bent in one of the height direction D2 and the width direction D3 in the internal space 7*b* of the plug frame 7. The shape of the internal space 7*b* viewed along the height direction D2 and the shape of the internal space 7*b* viewed along the width direction D3 are, for example, arc-shaped.

The plug frame 7 has a connecting portion accommodation portion 7*c* accommodating the optical fiber connecting portion 3 and a guide portion 7*d* guiding the optical fiber C1 extending from the optical cable C. The plug frame 7 is, for example, integrally molded and configured with a resin and has no seams. The spring 4, the mechanical splice 5, and the ferrule 6 are accommodated in the connecting portion accommodation portion 7*c*. The guide portion 7*d* has a curved face 7*f* facing the bent optical fiber C1. The internal space 7*b* of the plug frame 7 described above is defined by the curved face 7*f*.

Figure 3:
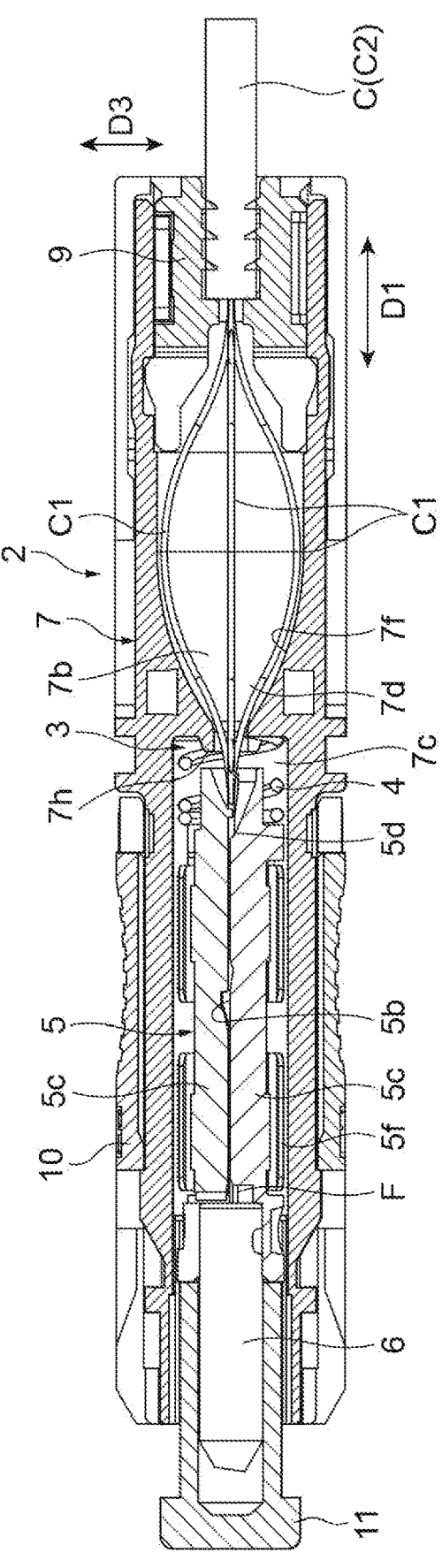
FIG. 3 is a longitudinal cross-sectional view of the optical connector according to the embodiment different from FIG. 2.

FIG. 2 is a cross-sectional view of the optical connector 1 cut along a plane extending in the longitudinal direction D1 and the height direction D2. FIG. 3 is a cross-sectional view of the optical connector 1 cut along a plane extending in the longitudinal direction D1 and the width direction D3. It is noted that, for the convenience of description, in FIGS. 1 to 3, the state in which a wedge 21 of an optical connecting jig 20 is inserted into the mechanical splice 5 is illustrated, but in a normal state, the optical connector connecting jig 20 is removed. As illustrated in FIGS. 1 to 3, the mechanical splice 5 is accommodated in the knob 10. A through-hole 10*b* is formed in the knob 10. A wedge 21 of the optical connector connecting jig 20 for expanding an optical fiber arrangement space 5*b* of the mechanical splice 5 is inserted into the through-hole 10*b*. The knob 10 has, for example, the two through-holes 10*b* aligned side by side along the longitudinal direction D1, and the wedges 21 are inserted through the respective through-holes 10*b*.

For example, the optical connector connecting jig 20 includes a pair of first engagement portions 24 aligned side by side along the width direction D3 and a pair of second engagement portions 25 aligned side by side along the width direction D3. The second engagement portion 25 is located on the front side (on a ferrule cap 11 side) of the optical connector connecting jig 20. The first engagement portion 24 is located on the rear side of the knob 10. For example, the second engagement portion 25 is engaged with the knob 10 and the first engagement portion 24 is engaged with the plug frame 7. Specifically, a protrusion is formed on each of the side portion of the knob 10 and the side portion of the plug frame 7. The second engagement portion 25 is engaged with the protrusion on the side of the knob 10, and the first engagement portion 24 is engaged with the protrusion on the side portion of the plug frame 7.

The mechanical splice 5 has a pair of holding members 5*c*, a V-groove 5*d*, and a clamp 5*f*. The pair of holding members 5*c* are aligned side by side along the width direction D3. The V-groove 5*d* defines the optical fiber arrangement space 5*b* formed between the pair of holding members 5*c*. The clamp 5*f* is a spring member biasing the pair of holding members 5*c* in a direction to close the optical fiber arrangement space 5*b*. The internal space 7*b* extending from the V-groove 5*d* to the outer sheath fixing portion 9 serves as a bending region for the optical fiber C1. For example, the distance of the bending region of the optical fiber C1 in the longitudinal direction D1 is 19 mm or more.

The wedge 21 inserted through the through-hole 10*b* of the knob 10 enters between the pair of holding members 5*c*. Accordingly, the optical fiber arrangement space 5*b* is in an expanded state. On the other hand, when the wedge 21 is pulled out from the pair of holding members 5*c* and the optical connector connecting jig 20 is removed from the optical connector 1, the optical fiber arrangement space 5*b* is closed, so that the optical fiber C1 entering the V-groove 5*d* is in a held state.

A built-in fiber F optically connected to the optical fiber C1 is provided in the inside the mechanical splice 5 (between the pair of holding members 5*c*) and the ferrule 6. The mechanical splice 5 connects the built-in fiber F and the optical fiber C1 to each other. The built-in fiber F is provided inside the ferrule 6 in advance. For example, the ferrule cap 11 sealing the ferrule 6 from the opposite side of the mechanical splice 5 is detachably attached to the ferrule 6.

For example, at the site of connection work, the wedge 21 of the optical connector connecting jig 20 allows the optical fiber arrangement space 5*b* to be in a state of being expanded in advance. In this state, the optical fiber C1 from the optical cable C is inserted into the optical fiber arrangement space 5*b*. After the optical fiber C1 is connected to the built-in fiber F, the optical connector connecting jig 20 is removed, and the built-in fiber F and the optical fiber C1 are fixed inside the mechanical splice 5. The connecting portion between the optical fiber C1 and the built-in fiber F is located, for example, in a lower portion of the wedge 21 on the front side (ferrule 6 side).

Figure 4:
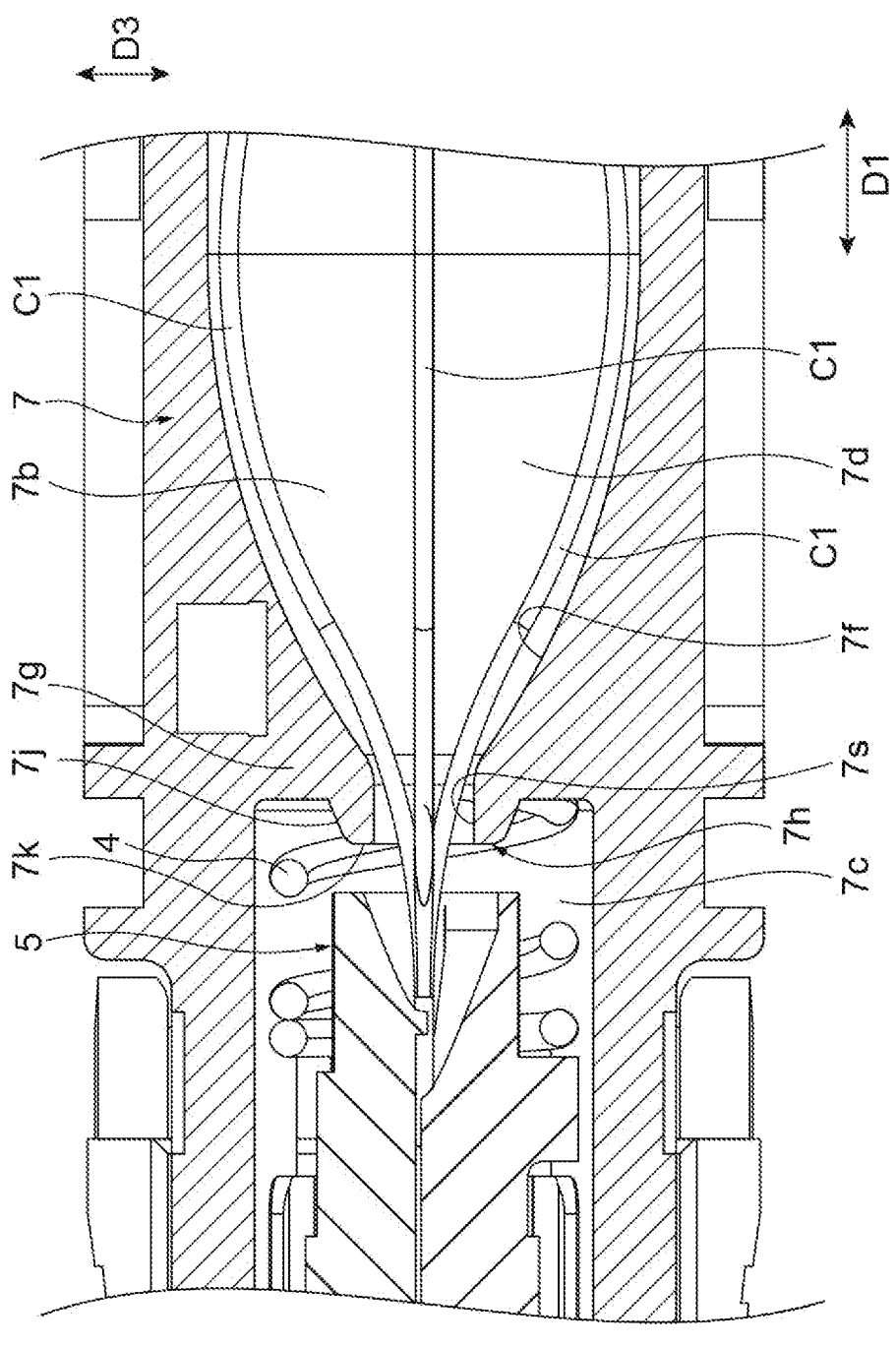
FIG. 4 is a cross-sectional view illustrating a connecting portion accommodation portion, a partition wall, and a guide portion of the optical connector of FIG. 1.

Next, the spring 4, the mechanical splice 5 and the plug frame 7 will be described in detail with reference to FIGS. 3 and 4. FIG. 4 is an enlarged cross-sectional view of the mechanical splice 5 and the plug frame 7 where the spring 4 is arranged. The plug frame 7 includes a partition wall 7g partitioning the connecting portion accommodation portion 7c and the guide portion 7d. The partition wall 7g has a cylindrical protrusion 7h protruding to the connecting portion accommodation portion 7c. The protrusion 7h protrudes to the opposite side of the guide portion 7d. Due to the protrusion 7h, the internal space 7b, which is the bending region of the optical fiber C1, is extended toward the connecting portion accommodation portion 7c side.

The mechanical splice 5 is arranged to be separated from the partition wall 7g toward the ferrule 6 side. The protrusion 7h protrudes from the partition wall 7g toward the connecting portion accommodation portion 7c side. The protrusion 7h has, for example, a tapered face 7j extending obliquely from the partition wall 7g so that the diameter of the protrusion 7h is reduced, and a top face 7k that faces the mechanical splice 5. A portion of the spring 4 is arranged to surround the protrusion 7h. The spring 4 is interposed between the mechanical splice 5 and the partition wall 7g. The spring 4 biases the mechanical splice 5 and the ferrule 6 coupled thereto forward (in the direction from the mechanical splice 5 toward the ferrule 6). Accordingly, the mechanical splice 5 and the ferrule 6 are accommodated in the connecting portion accommodation portion 7c of the plug frame 7 in a state of being movable along the longitudinal direction D1.

The internal space 7b, which is a bending space for the optical fiber C1, extends from a hole 7s formed inside the protrusion 7h to the guide portion 7d. The curved face 7f of the guide portion 7d spreads in a conical shape from the partition wall 7g. For example, the shape of the curved face 7f viewed along the height direction D2 and the shape of the curved face 7f viewed along the width direction D3 are arc-shaped. In this case, the radius of curvature of the curved face 7f is, for example, 13 mm or more.

Figure 5:
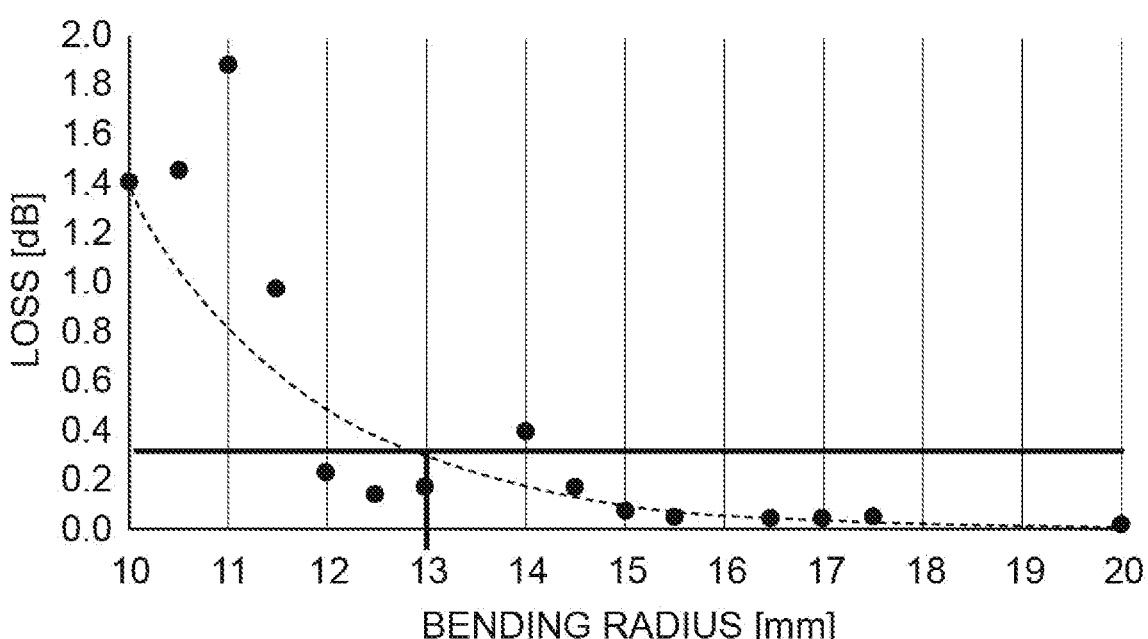
FIG. 5 is a graph illustrating an example of a relationship between bending radius and loss of light in an optical fiber.

FIG. 5 is a graph illustrating an example of the relationship between the bending radius of the optical fiber C1 and the loss of light. As illustrated in FIG. 5, when the radius of curvature of the optical fiber C1 is 13 mm or more, the loss of light can be suppressed to 0.3 dB or less. Therefore, as described above, when the radius of curvature of the curved face 7f is 13 mm or more, even if the optical fiber C1 is bent along the curved face 7f, the radius of curvature of the optical fiber C1 can be allowed to be 13 mm or more. As a result, the loss of light in the optical fiber C1 can be suppressed.

Figure 6:
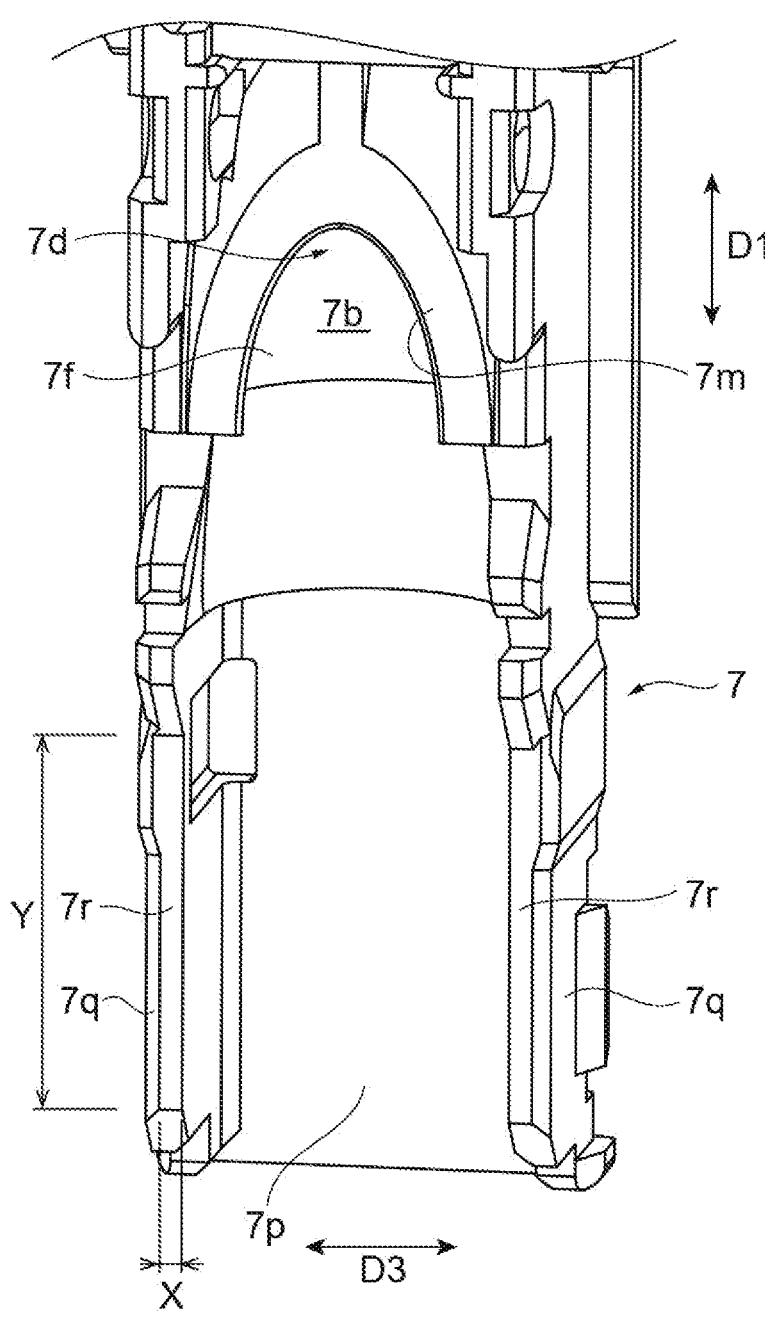
FIG. 6 is a view illustrating a plug frame in an optical fiber connector main body of FIG. 1.

FIG. 6 is a plan view of the internal space 7b of the plug frame 7 viewed along the height direction D2. As illustrated in FIG. 6, the plug frame 7 is opened on the opposite side (upper side) of the curved face 7f. The optical fiber C1 can be inserted into the guide portion 7d from this opened portion. The guide portion 7d has a horseshoe-shaped opening portion 7m. The opening portion 7m is provided so that a distal end of the optical fiber C1 can be easily inserted into the guide portion 7d.

The plug frame 7 has a bottom portion 7p and a pair of wall portions 7q defining the outer sheath fixing portion accommodation space accommodating the outer sheath fixing portion 9 described above. A pair of end faces 7r are aligned side by side, for example, along the width direction D3. The end face 7r of the wall portion 7q facing the opposite side of the bottom portion 7p is a flat face. For example, the length of the end face 7r in the width direction D3 (width X) is 0.4 mm or more, and the length Y of the end face 7r in the longitudinal direction D1 is 2 mm or more.

Figure 7:
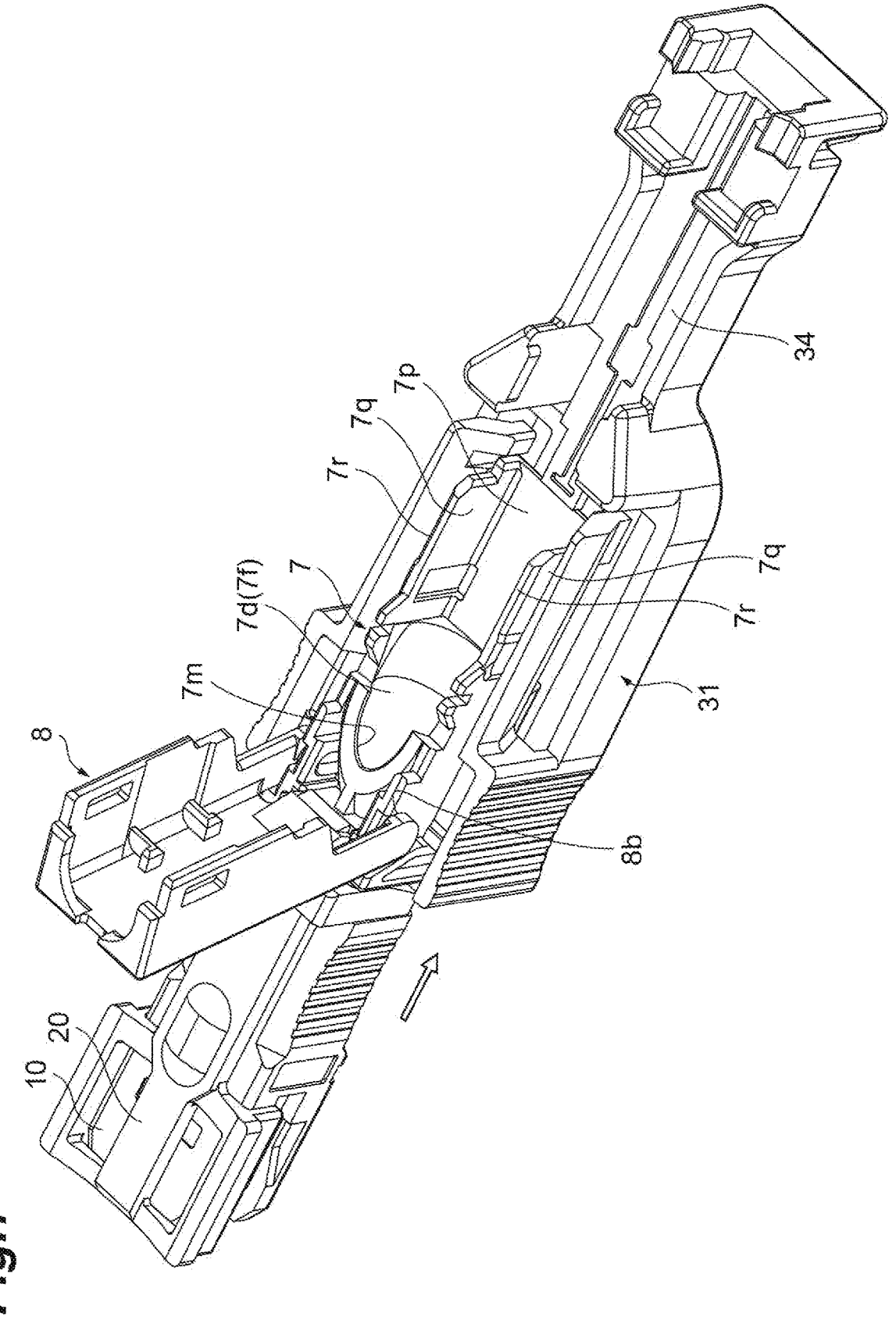
FIG. 7 is a diagram illustrating a procedure for installing an optical cable and an optical fiber to an optical connector.
Figure 8:
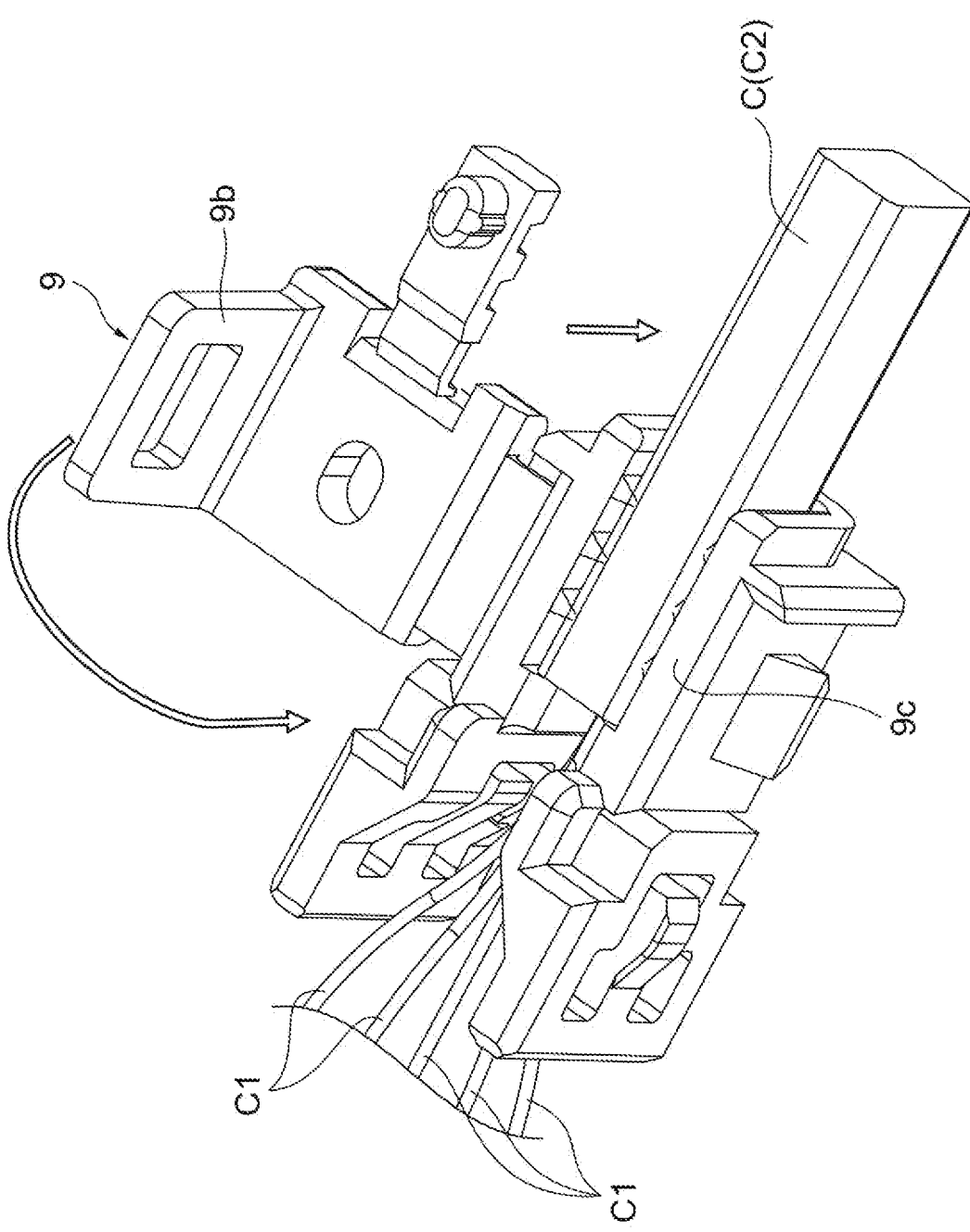
FIG. 8 is a diagram illustrating a continuation of the procedure of FIG. 7.

Next, an example of a method for connecting the optical cable C and the optical fiber C1 to the optical connector 1 will be described with reference to FIGS. 7 to 15. First, as illustrated in FIG. 7, the rear cover 8 is rotated around the shaft portion 8b to open the guide portion 7d of the plug frame 7. A guide rail 31 for supporting the plug frame 7 is arranged on the lower side of the plug frame 7. Then, as illustrated in FIG. 8, the optical cable C from which the optical fiber C1 protrudes is installed on a main body portion 9c of the outer sheath fixing portion 9 in a state where a lid 9b of the outer sheath fixing portion 9 is opened. The optical cable C is fixed to the outer sheath fixing portion 9.

Figure 9:
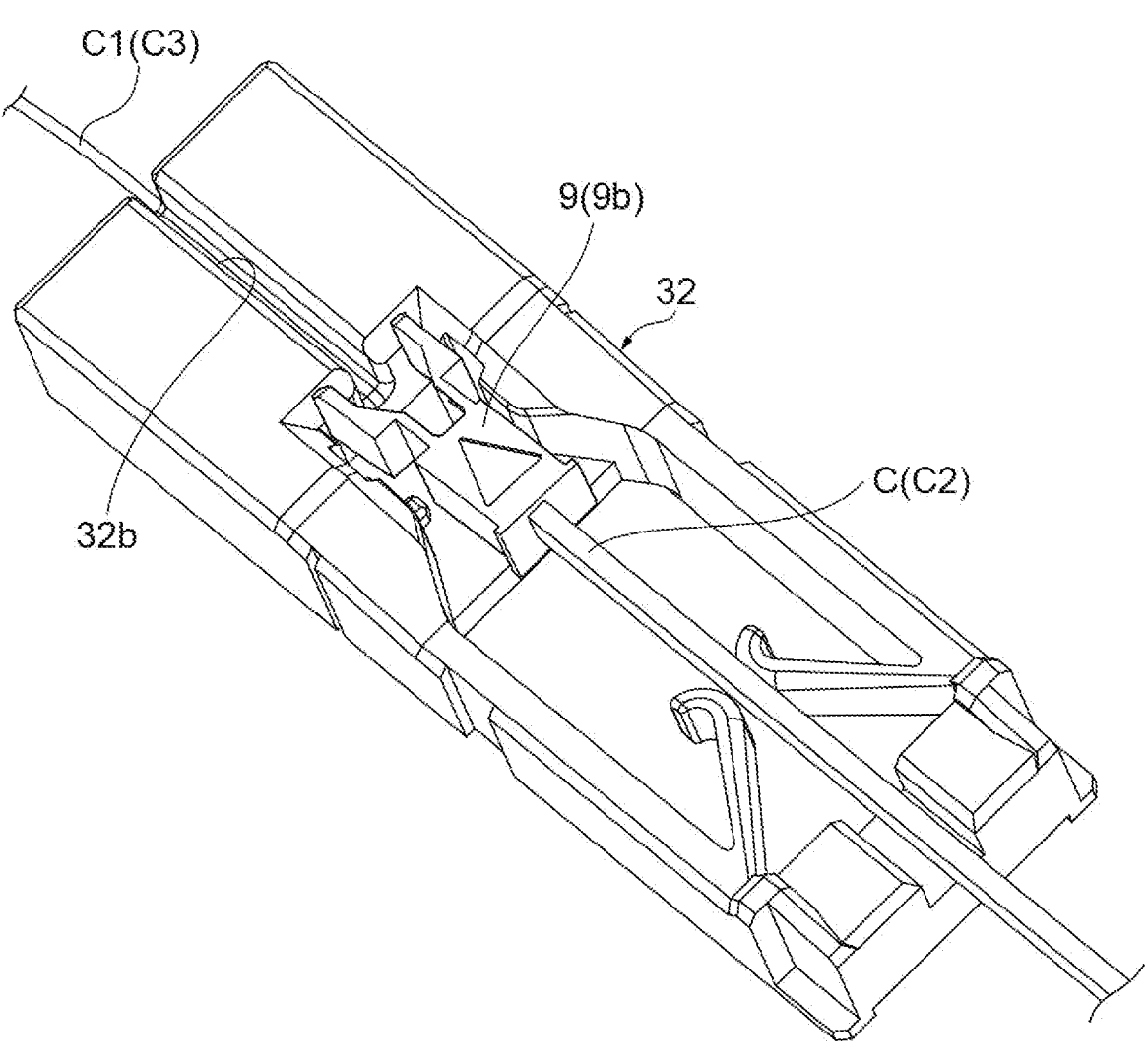
FIG. 9 is a diagram illustrating a continuation of the procedure of FIG. 8.

Subsequently, as illustrated in FIG. 9, the outer sheath fixing portion 9 and the optical cable C are installed on a cut spacer 32 for cutting the optical fiber C1 protruding from the optical cable C. At this time, the optical fiber C1 protruding from the optical cable C is inserted into a groove 32b of the cut spacer 32. Then, while removing the outer sheath of a portion C3 of the optical fiber C1 extending from the cut spacer 32, the portion C3 is cut by a fiber cutter (not illustrated) to have a predetermined length.

Figure 10:
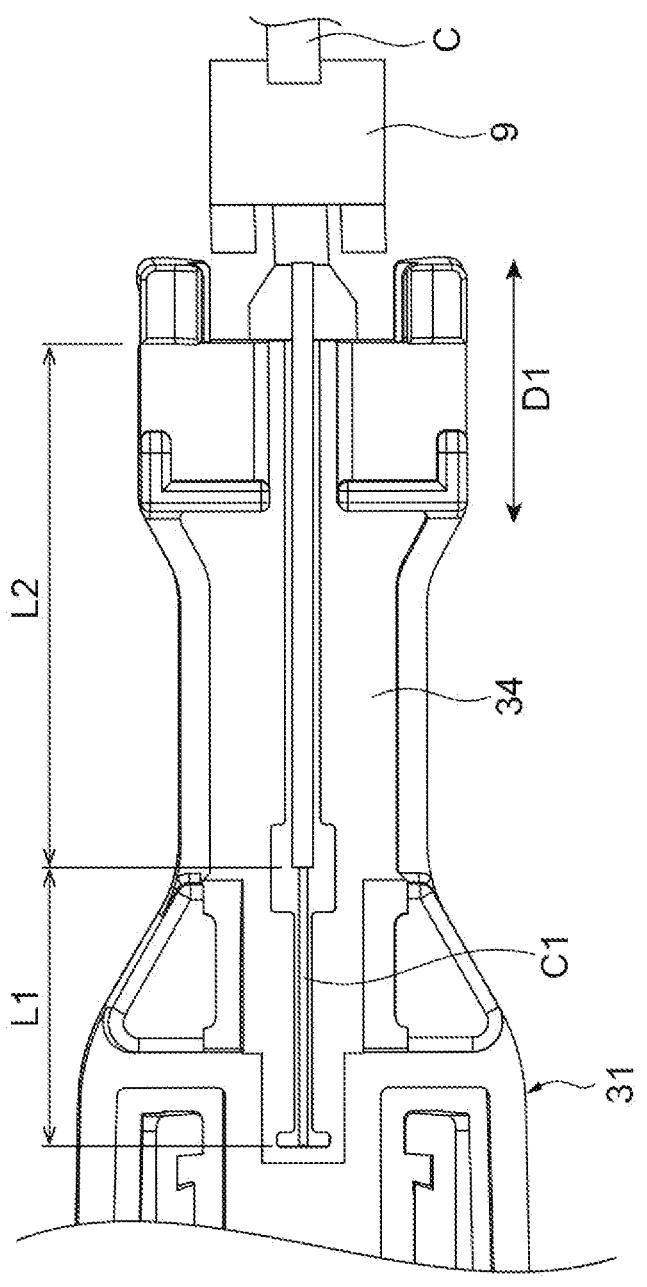
FIG. 10 is a diagram illustrating a continuation of the procedure of FIG. 9.

After cutting the above-mentioned portion C3 of the optical fiber C1, as illustrated in FIG. 10, a length L1 of the fiber C1 of the portion where the outer sheath is removed and a length L2 of the fiber C1 of the portion where the outer sheath is not removed are confirmed by a length measurement unit 34 of the guide rail 31. Accordingly, the length L1 and the length L2 can be managed with high accuracy. After that, the optical fiber C1, the outer sheath fixing portion 9, and the optical cable C are inserted into the plug frame 7 along the longitudinal direction D1.

Figure 11:
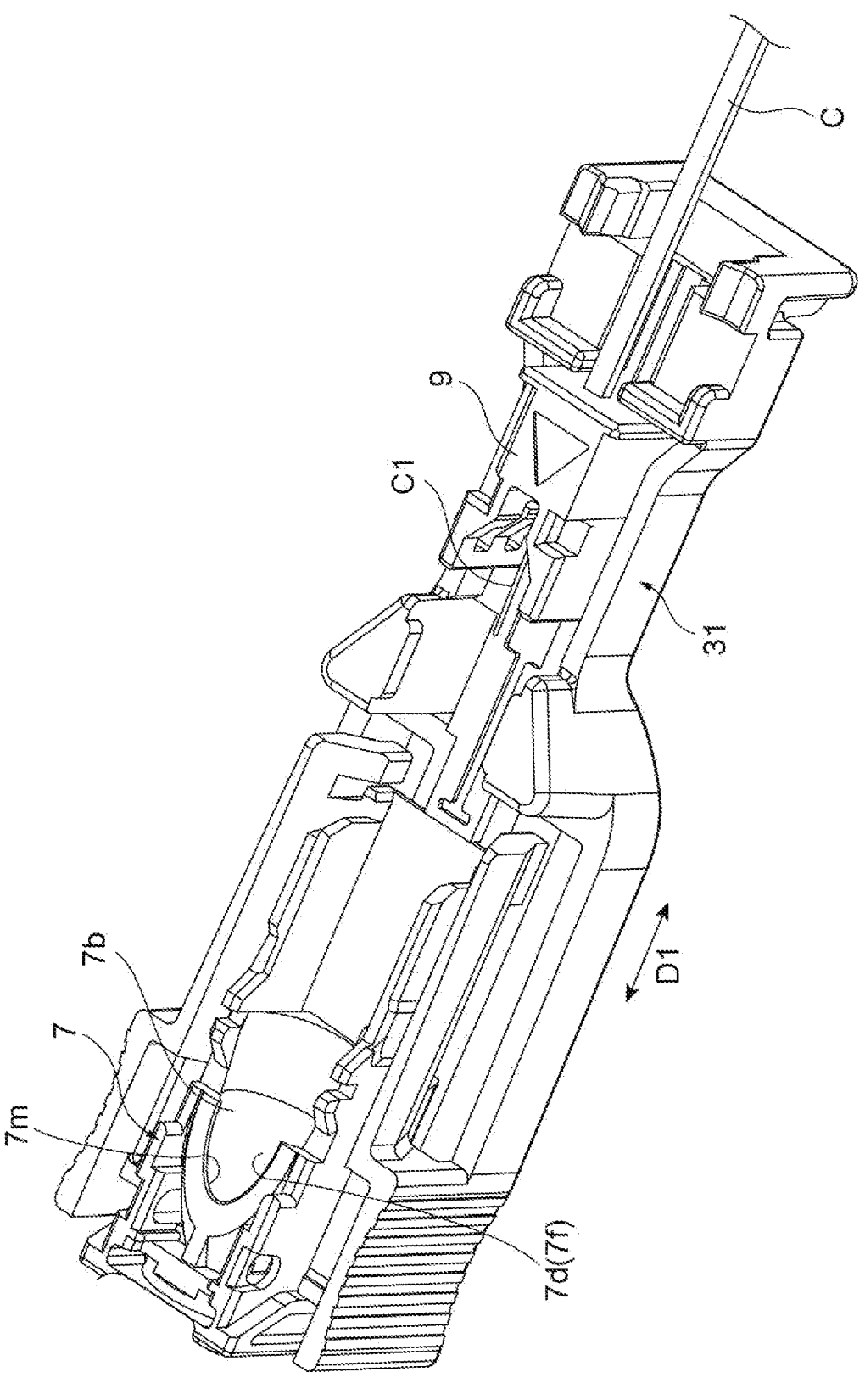
FIG. 11 is a diagram illustrating a continuation of the procedure of FIG. 10.
Figure 12:
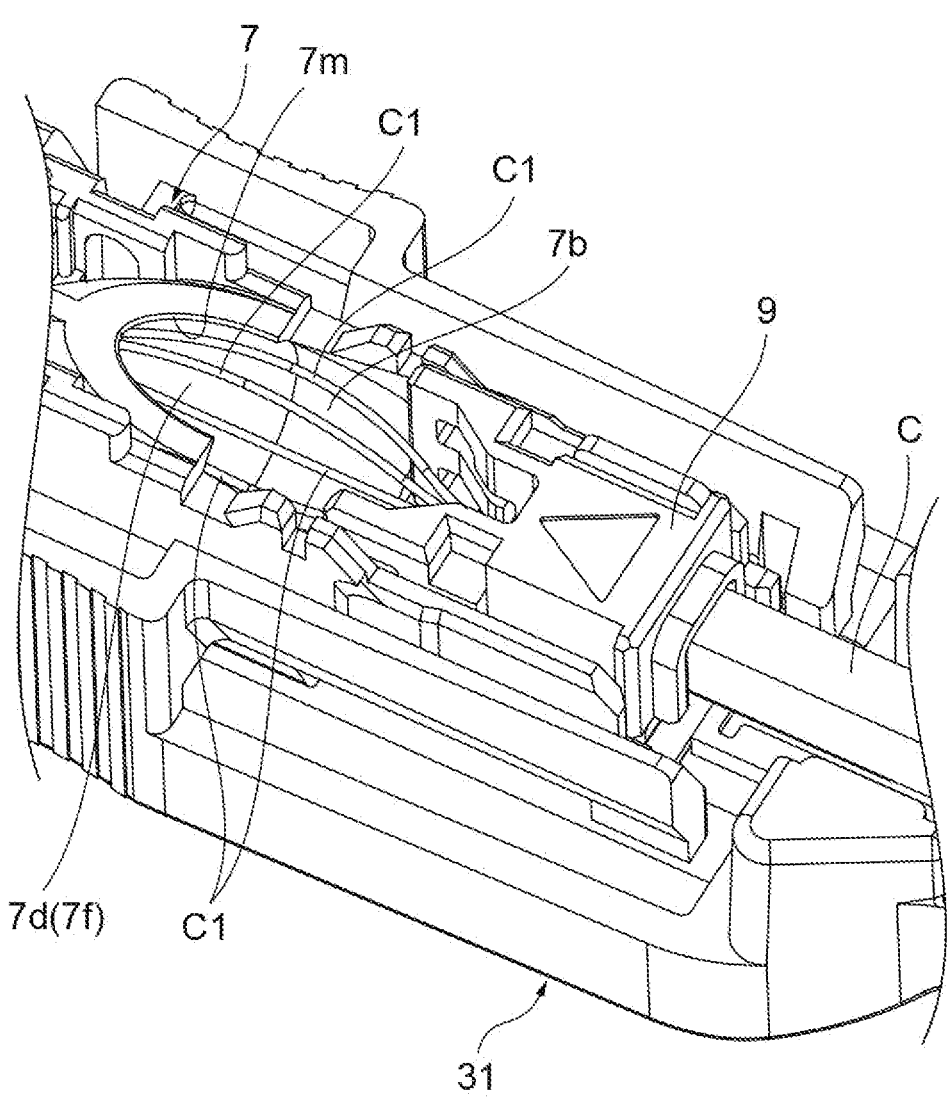
FIG. 12 is a diagram illustrating a continuation of the procedure of FIG. 11.
Figure 13:
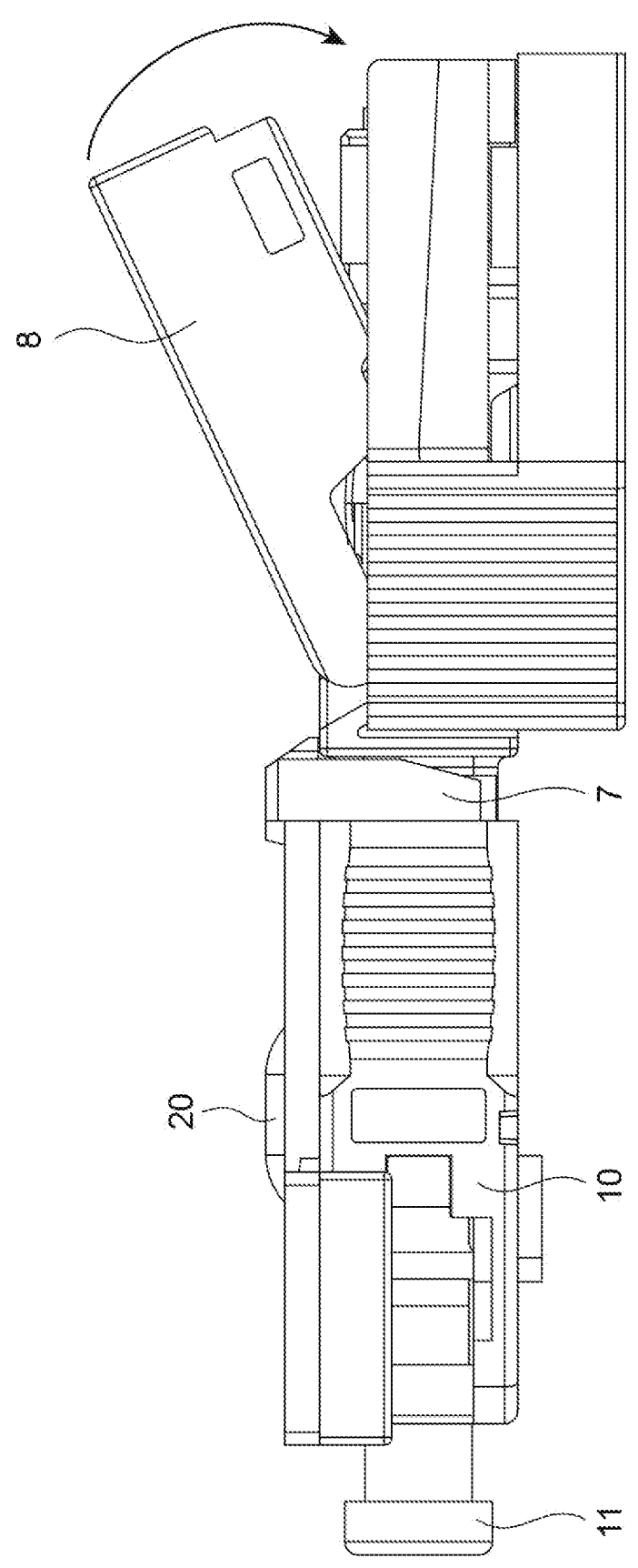
FIG. 13 is a diagram illustrating a continuation of the procedure of FIG. 12.
Figure 14:
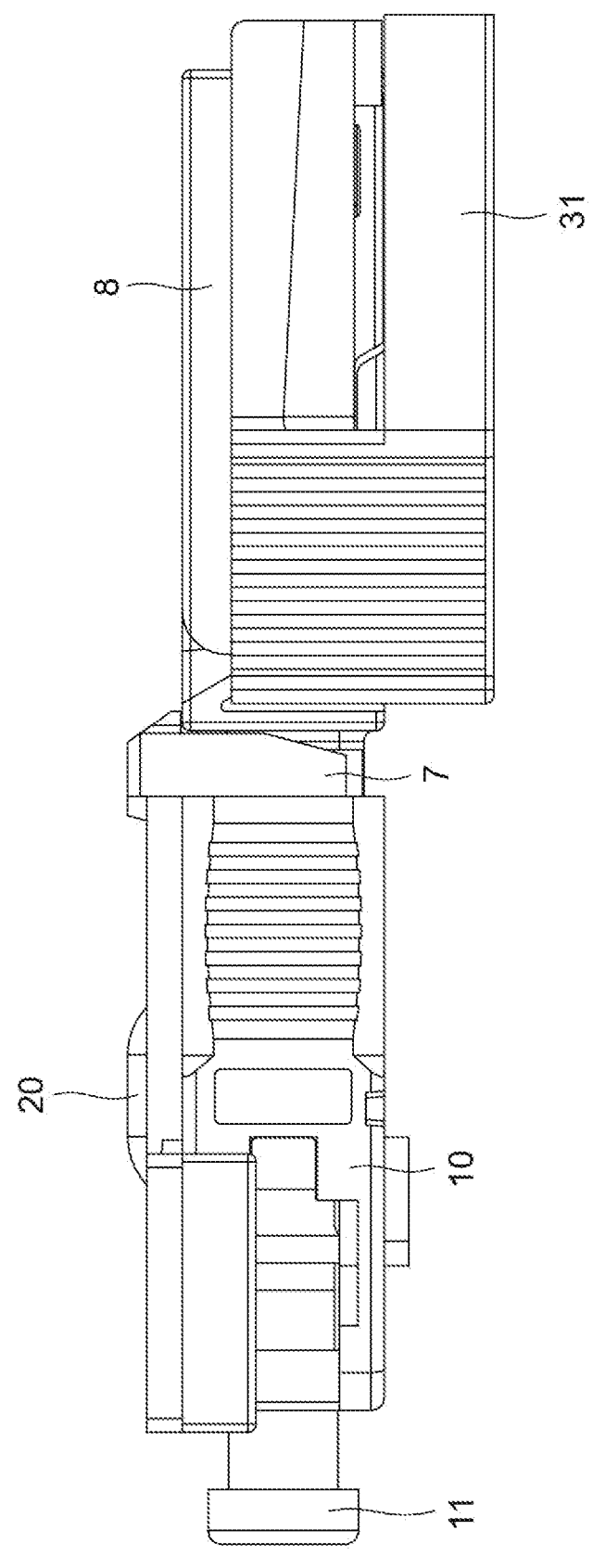
FIG. 14 is a diagram illustrating a continuation of the procedure of FIG. 13.

At this time, as illustrated in FIGS. 11 and 12, the optical fiber C1, the outer sheath fixing portion 9, and the optical cable C are moved to the plug frame 7 along the guide rail 31, and the optical fiber C1 is inserted into the hole 7s (refer to FIG. 4). Then, the optical fiber C1 is inserted into the mechanical splice 5 while bending the optical fiber C1 along the curved face 7f of the guide portion 7d, and the optical fiber C1 is connected to the built-in fiber F. This connection work is performed while checking the bending state of the optical fiber C1.

Figure 15:
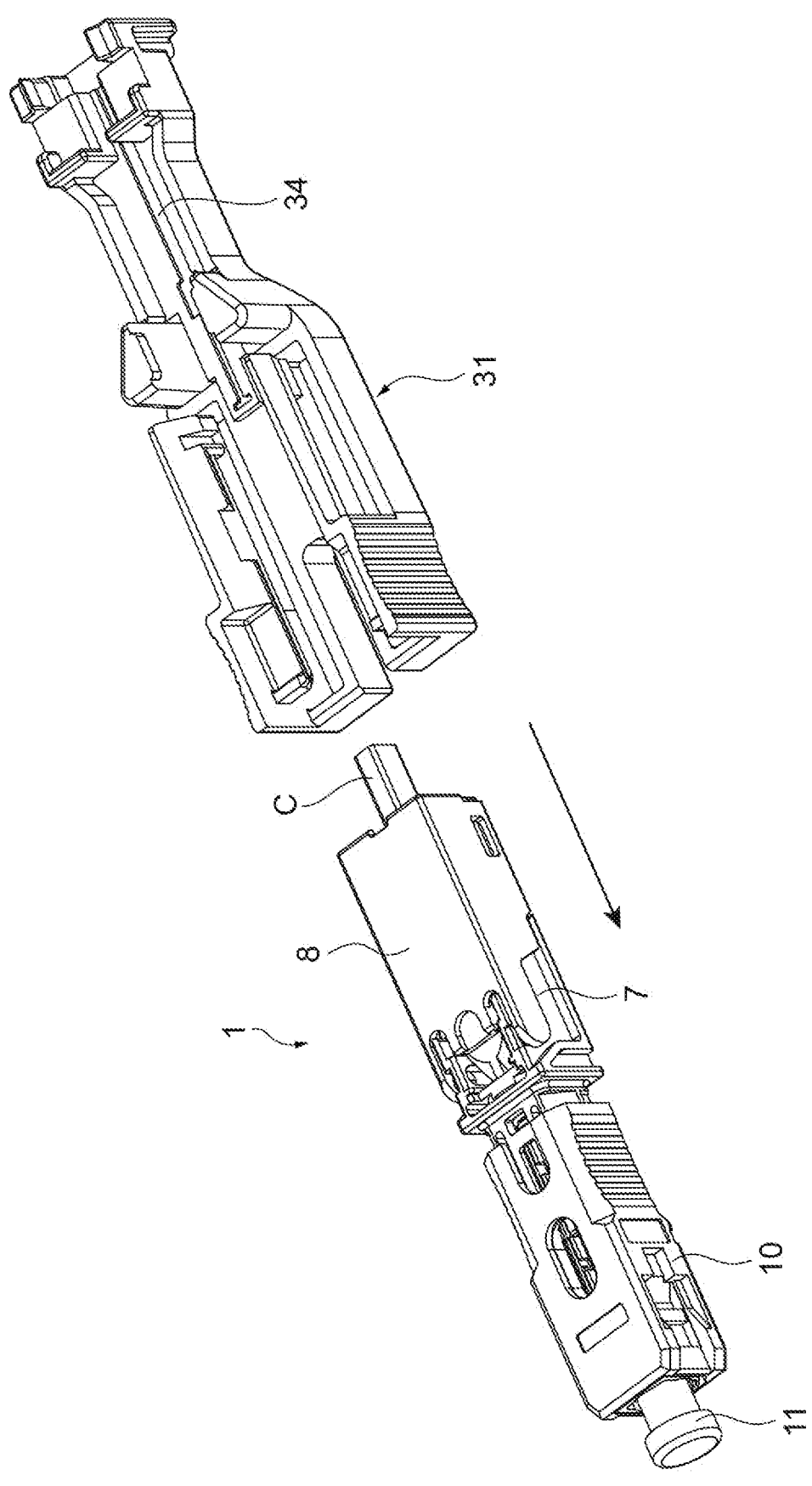
FIG. 15 is a diagram illustrating a continuation of the procedure of FIG. 14.

After the connection for the optical fiber C1 as described above is performed, as illustrated in FIGS. 13 and 14, the rear cover 8 is rotated about the shaft portion 8b to close the guide portion 7d of the plug frame 7. Then, the optical connector connecting jig 20 is removed, so that the wedge 21 is pulled out from the inside of the mechanical splice 5, and the built-in fiber F and the optical fiber C1 are fixed within the mechanical splice 5. Next, as illustrated in FIG. 15, the guide rail 31 is removed from the optical connector 1 (plug frame 7) to complete a series of processes of the connection work of the optical cable C.

Next, the functions and effects of the optical connector 1 according to this embodiment will be described. For example, as illustrated in FIGS. 2 to 4, in the optical connector 1, the connector main body 2 includes the plug frame 7 integrally formed. The plug frame 7 has the guide portion 7d for guiding the optical fiber C1 extending from the optical cable C. Since the plug frame 7 provided with the guide portion 7d for guiding the optical fiber C1 is integrally formed, the plug frame 7 is configured with one component and is seamlessly manufactured. Therefore, the optical fiber C1 can be avoided from being caught in the seams. Since the plug frame 7 is integrally molded and configured with one component, the number of joints between the components can be reduced. Therefore, a wider internal space 7*b* for the optical fiber C1 can be secured than in the case of having a plurality of the components with the same external size. Therefore, a large space for bending the optical fiber C1 can be secured.

The connecting portion accommodation portion 7*c* in which the optical fiber C1 of the optical cable C is connected to the built-in fiber F and the guide portion 7*d* are partitioned via the partition wall 7*g*. The partition wall 7*g* has the cylindrical protrusion 7*h* protruding toward the connecting portion accommodation portion 7*c*. Therefore, the region for bending the optical fiber C1 can be secured as wide as the hole 7*s* of the protrusion 7*h*. In addition, the guide portion 7*d* in which the optical fiber C1 is accommodated has the horseshoe-shaped opening portion 7*m* and has a curved face 7*f* spreading in a conical shape from the partition wall 7*g*. Therefore, the optical fiber C1 can be easily inserted from the opening portion 7*m* into the guide portion 7*d*, and the curved face 7*f* spreading in a conical shape can ensure a wider region for bending the optical fiber C1.

The mechanical splice 5 may be arranged to be separated from the partition wall 7*g*. In this case, a space for moving the mechanical splice 5 in the longitudinal direction D1 can be formed between the mechanical splice 5 and the partition wall 7*g*.

A portion of the spring 4 may be arranged to surround the cylindrical protrusion 7*h*. In this case, the cylindrical protrusion 7*h* that widens the bending space of the optical fiber C1 can be effectively used for arranging the spring 4.

As illustrated in FIG. 6, the plug frame 7 may have the bottom portion 7*p* and the pair of wall portions 7*q* defining the outer sheath fixing portion accommodation space accommodating the outer sheath fixing portion 9 fixing the outer sheath C2 of the optical cable C. The end face 7*r* of each of the pair of wall portions 7*q* facing the opposite side of the bottom portion 7*p* may include a flat face having a width X of 0.4 mm or more and a length Y of 2 mm or more. In this case, a large area of the end face 7*r* facing the opposite side of the bottom portion 7*p* of the plug frame 7 can be secured. Therefore, when the plug frame 7 is molded with a resin, the possibility of occurrence of deformation or the like due to increased pressure from the mold can be reduced. Therefore, the molding of the plug frame 7 can be easily performed.

As illustrated in FIGS. 2 to 4, the optical connector 1 may include the outer sheath fixing portion 9 fixing the outer sheath C2 of the optical cable C. The mechanical splice 5 may have the V-groove 5*d* into which the optical fiber C1 is inserted, and the distance from the V-groove 5*d* to the outer sheath fixing portion 9 may be 19 mm or more. In this case, since the length of the internal space 7*b* in the longitudinal direction D1 from the V-groove 5*d* through which the optical fiber C1 extends to the outer sheath fixing portion 9 can be set to 19 mm or more, the length of the internal space 7*b* allowing the bending of the optical fiber C1 can be increased.

The optical connector 1 may include the outer sheath fixing portion 9 fixing the outer sheath C2 of the optical cable C. The curved face 7*f* may be curved in an arc shape between the partition wall 7*g* and the outer sheath fixing portion 9, and the radius of curvature of the curved face 7*f* may be 13 mm or more. In this case, since the curved face 7*f* of the guide portion 7*d* is curved in an arc shape, a wider internal space 7*b* for bending the optical fiber C1 in the guide portion 7*d* can be secured. Furthermore, since the radius of curvature of the curved face 7*f* is 13 mm or more, the loss of light due to bending of the optical fiber C1 can be more reliably reduced.

Heretofore, the embodiment of the optical connector according to the present disclosure has been described. However, the invention is not limited to the embodiments described above. That is, it is easily understood by those skilled in the art that the present invention can be modified and changed in various ways within the scope of the spirit described in the claims. For example, the shape, size, number, material, and layout of each portion of the optical connector can be changed as appropriate within the scope of the above-described spirit.

REFERENCE SIGNS LIST

1: optical connector, 2: connector main body, 3: optical fiber connecting portion, 4: spring, 5: mechanical splice, 5*b*: optical fiber arrangement space, 5*c*: holding member, 5*d*: V-groove, 5*f*: clamp, 6: ferrule, 7: plug frame, 7*b*: internal space, 7*c*: connecting portion accommodation portion, 7*d*: guide portion, 7*f*: curved face, 7*g*: partition wall, 7*h*: protrusion, 7*j*: tapered face, 7*k*: top face, 7*m*: opening portion, 7*p*: bottom portion, 7*q*: wall portion, 7*r*: end face, 7*s*: hole, 8: rear cover, 8*b*: shaft portion, 9: outer sheath fixing portion, 9*b*: lid, 9*c*: main body portion, 10: knob, 10*b*: through-hole, 11: ferrule cap, 20: optical connector connecting jig, 21: wedge, 31: guide rail, 32: cut spacer, 32*b*: groove, 34: length measurement unit, C: optical cable, C1: optical fiber, C2: outer sheath, C3: portion, D1: longitudinal direction, D2: height direction, D3: width direction, F: built-in fiber, X: width.

The invention claimed is:

1. An optical connector comprising:

a connector main body;

an optical fiber connecting portion incorporated in the connector main body and having a built-in fiber connected to an optical fiber of an optical cable; and an outer sheath fixing portion fixing an outer sheath of the optical cable, wherein the connector main body includes an integrally formed plug frame, wherein the optical fiber connecting portion includes:

a ferrule holding the built-in fiber; and a mechanical splice connecting the built-in fiber and the optical fiber to each other, wherein the plug frame includes:

a connecting portion accommodation portion accommodating the ferrule, the mechanical splice, and a spring biasing the mechanical splice; and a guide portion guiding the optical fiber extending from the optical cable, wherein the connecting portion accommodation portion and the guide portion are partitioned via a partition wall having a cylindrical protrusion protruding into the connecting portion accommodation portion, wherein the guide portion has a horseshoe-shaped opening portion and a curved face spreading in a conical shape from the partition wall, wherein the curved face is curved in an arc shape between the partition wall and the outer sheath fixing portion, and wherein a radius of curvature of the curved face is 13 mm or more.

2. The optical connector according to claim 1, wherein the mechanical splice is arranged to be separated from the partition wall.

3. The optical connector according to claim 1, wherein a portion of the spring is arranged to surround the cylindrical protrusion.

4. The optical connector according to claim 1, wherein the plug frame has a bottom portion and a pair of wall portions defining an outer sheath fixing portion accommodation space accommodating the outer sheath fixing portion fixing the outer sheath of the optical cable, and wherein an end surface of each of the pair of wall portions facing an opposite side of the bottom portion includes a flat face having a width of 0.4 mm or more and a length of 2 mm or more.

5. The optical connector according to claim 1, wherein the mechanical splice has a V-groove into which the optical fiber is inserted, and wherein a distance from the V-groove to the outer sheath fixing portion is 19 mm or more.

6. An optical connector comprising:

a connector main body; and an optical fiber connecting portion incorporated in the connector main body and having a built-in fiber connected to an optical fiber of an optical cable, wherein the connector main body includes an integrally formed plug frame, wherein the optical fiber connecting portion includes:

a ferrule holding the built-in fiber; and a mechanical splice connecting the built-in fiber and the optical fiber to each other, wherein the plug frame includes:

a connecting portion accommodation portion accommodating the ferrule, the mechanical splice, and a spring biasing the mechanical splice; and a guide portion guiding the optical fiber extending from the optical cable, wherein the connecting portion accommodation portion and the guide portion are partitioned via a partition wall having a cylindrical protrusion protruding into the connecting portion accommodation portion,

wherein the guide portion has a horseshoe-shaped opening portion and a curved face spreading in a conical shape from the partition wall, wherein the plug frame has a bottom portion and a pair of wall portions defining an outer sheath fixing portion accommodation space accommodating an outer sheath fixing portion fixing an outer sheath of the optical cable, and wherein an end surface of each of the pair of wall portions facing an opposite side of the bottom portion includes a flat face having a width of 0.4 mm or more and a length of 2 mm or more.

7. An optical connector comprising:

a connector main body;

an optical fiber connecting portion incorporated in the connector main body and having a built-in fiber connected to an optical fiber of an optical cable; and an outer sheath fixing portion fixing an outer sheath of the optical cable, wherein the connector main body includes an integrally formed plug frame, wherein the optical fiber connecting portion includes:

a ferrule holding the built-in fiber; and a mechanical splice connecting the built-in fiber and the optical fiber to each other, wherein the plug frame includes:

a connecting portion accommodation portion accommodating the ferrule, the mechanical splice, and a spring biasing the mechanical splice; and a guide portion guiding the optical fiber extending from the optical cable, wherein the connecting portion accommodation portion and the guide portion are partitioned via a partition wall having a cylindrical protrusion protruding into the connecting portion accommodation portion, wherein the guide portion has a horseshoe-shaped opening portion and a curved face spreading in a conical shape from the partition wall, wherein the mechanical splice has a V-groove into which the optical fiber is inserted, and wherein a distance from the V-groove to the outer sheath fixing portion is 19 mm or more.

* * * * *